April 6, 1948.  F. L. SHORT  2,438,979
FRAME AND HARNESS FOR DOG BATHS
Filed Jan. 23, 1946

FRANK LEA SHORT
INVENTOR

BY John P. Wilson
ATTORNEY

Patented Apr. 6, 1948

2,438,979

UNITED STATES PATENT OFFICE 2,438,979

FRAME AND HARNESS FOR DOG BATHS

Frank Lea Short, New York, N. Y.

Application January 23, 1946, Serial No. 642,800

7 Claims. (Cl. 119—101)

My invention relates to bathing harnesses for animals and has particular reference to harnesses and frames for bathing small animals such as dogs in a bath tub.

My invention has for its object to provide a device for holding an animal such as a dog in a fixed position in a bath tub to make it convenient to wash the dog without any interference on the part of the latter, and without causing any particular discomfort to the animal.

Another object of my invention is to provide a device of the character above indicated which can be easily and conveniently taken apart for storing in a small space, and which can be again easily assembled for use.

An allied object of my invention is to provide means for detachably securing the device in a bath tub and for adjusting the width of the supporting frame of the device to suit bath tubs of different width.

My invention is more specifically described in the accompanying specification and drawings in which.

Figure 1:
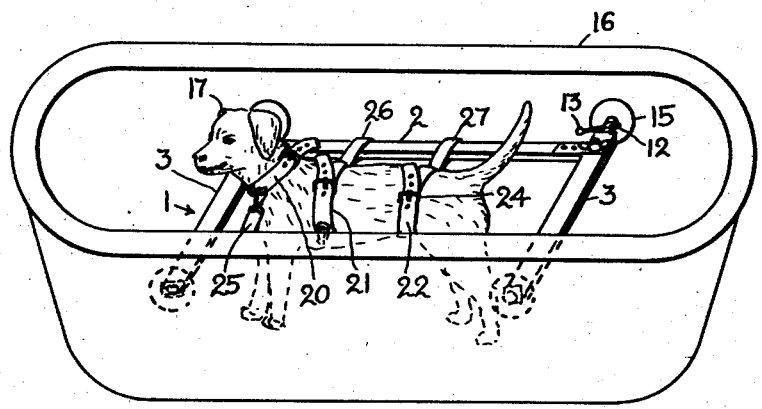
Fig. 1 is a perspective view of my device in a bath tub, showing a dog harnessed for being washed.
Figure 2:
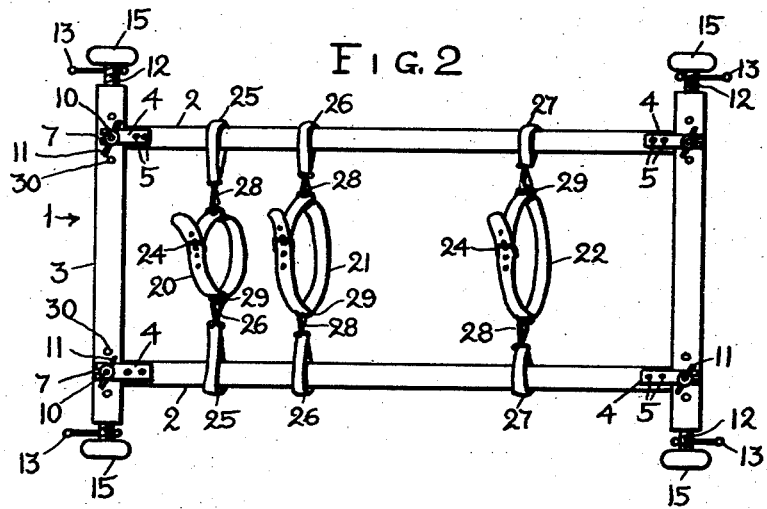
Fig. 2 is a top plan view of my device.

My harness for bathing animals comprises a frame generally designated 1 and consisting of longitudinal bars 2 and transverse bars 3. The longitudinal bars are provided at the ends with metal plates 4 secured to the bars by screws or rivets 5. The ends of the plates are slotted at 7 for threaded studs 10 extending from the bars 3. Wing nuts 11 are threaded in the studs and are used for clamping the ends of the plates to the cross bars 3 thereby holding the bars together in the form of a rectangular frame.

Screws 12 are threaded into the ends of the cross bars 3 and are provided with handles 13 for turning the screws. The heads of the screws 13 are enclosed in relatively large caps 15 made of rubber or similar elastic material. The frame is placed in a bath tub 16 at a desired height and the screws 13 are turned until the rubber caps 15 engage the inner walls of the bath tub thereby firmly securing the frame in a desired position.

An animal such as a dog 17 is placed in the frame and is harnessed in a plurality of straps, 20, 21, 22. The strap 20 serves as a collar and is placed around the dog's neck as shown in Fig. 1. The strap 21 is placed around the dog's trunk near its front legs, and the strap 22 is similarly placed around the body of the dog near its hind legs. The straps provided with suitable buckles 24 for tightening the straps on the dog's body.

The straps are supported on the longitudinal bars 2 by connecting straps 25, 26, 27 looped around the bars, each connecting strap having its ends joined together and provided with a snap hook 28 of a conventional type detachably connected with a ring 29 secured to the side of the corresponding strap 20, 21 and 22.

My harness conveniently and securely holds the dog in the bath tub, without causing any undesirable inconvenience to the animal and also preventing the dog from shaking itself until it is thoroughly wiped after being washed.

The bars can be easily taken apart by loosening the wing nuts and tied together for storage or transportation. The connecting straps can be removed by sliding them off the bars 2 and also can be tied together for storage or transportation. Additional holes may be provided in the cross bars 3 for adjusting the position of the frame.

It will be understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. A harness for bathing an animal comprising a frame; means to removably support the frame in a bath tub; a plurality of straps adapted to be placed around the animal's body; and means to support the straps on the frame.

2. A harness for bathing an animal comprising a frame; means to removably support the frame in a bath tub; a plurality of straps adapted to be placed around the animal's neck and body; buckles on the straps; supporting straps removably supported on the frame; and detachable connections between the connecting straps and the first mentioned strap.

3. A harness for bathing an animal comprising a frame; means to removably support the frame in a bath tub; a plurality of straps adapted to be placed around the animal's neck and body; buckles on the straps; supporting straps removably supported on the frame; rings on the first mentioned straps; and snap hooks on the ends of the supporting straps for engaging the rings thereby supporting the first mentioned straps in the frame.

4. A harness for bathing an animal in a bath tub comprising a pair of longitudinal bars; a pair of cross bars; means to detachably connect the ends of the longitudinal bars to the cross bars; means at the ends of the cross bars for detachably securing the cross bars to the walls of a bath tub; a plurality of straps adapted to be placed around the animal's body; and means to support the straps on the longitudinal bars.

5. A harness for bathing an animal in a bath tub comprising a pair of longitudinal bars; a pair of cross bars; threaded studs extending from the sides of the cross bars; metal plates secured to the ends of the longitudinal bars and provided with openings for the studs; nuts on the studs for clamping the plates to the cross bars thereby joining the ends of the longitudinal bars with the cross bars and forming a rectangular frame; means at the ends of the cross bars for removably supporting the frame in a bath tub; a plurality of straps adapted to be placed around the animal's body; and means to support the straps on the longitudinal bars.

6. A harness for bathing an animal in a bath tub comprising a pair of longitudinal bars; a pair of cross bars; slots for the studs; wing nuts on the studs for clamping the plates to the cross bars thereby joining the ends of the longitudinal bars with the cross bars and forming a rectangular frame, the cross bars having a plurality of holes for the studs for adjusting the positions of the studs in the bars thereby varying the width of the frame; means at the ends of the cross bars for detachably securing the cross bars to the walls of a bath tub; a plurality of straps adapted to be placed around the animal's body; and means to support the straps on the longitudinal bars.

7. A harness for bathing an animal in a bath tub comprising a pair of longitudinal bars; a pair of cross bars; means to detachably connect the ends of the longitudinal bars to the cross bars; screws threaded in the ends of the bars; elastic heads on the ends of the screws for engaging the walls of a bath tub; handles on the screws for rotating the screws thereby changing the overall length of the cross bars for tightening the cross bars in a desired position in the bath tub; a plurality of straps adapted to be placed around the animal's body; and means to support the straps on the longitudinal bars.

FRANK LEA SHORT.

REFERENCES CITED

The following references are of record in the file of this patent:

UNITED STATES PATENTS

| Number | Name | Date |
|---|---|---|
| 2,237,177 | Fischer | Apr. 1, 1941 |
| 2,243,794 | Dunn | May 27, 1941 |